US011654818B2

(12) United States Patent
Zhang et al.

(10) Patent No.: US 11,654,818 B2
(45) Date of Patent: May 23, 2023

(54) ADJUSTMENT DEVICE FOR A VEHICLE LIGHT EMITTING MODULE

(71) Applicant: VALEO LIGHTING HUBEI TECHNICAL CENTER CO. LTD, Hubei (CN)

(72) Inventors: Hanbing Zhang, Wuhan (CN); Yan Liu, Wuhan (CN); Christophe Baert, Angers (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/971,261

(22) PCT Filed: Mar. 1, 2019

(86) PCT No.: PCT/CN2019/076681
§ 371 (c)(1),
(2) Date: Aug. 19, 2020

(87) PCT Pub. No.: WO2019/166011
PCT Pub. Date: Sep. 6, 2019

(65) Prior Publication Data
US 2021/0009028 A1   Jan. 14, 2021

(30) Foreign Application Priority Data

Mar. 2, 2018  (CN) .......................... 201810175416.5

(51) Int. Cl.
*B60Q 1/068* (2006.01)
*F21S 41/657* (2018.01)
(Continued)

(52) U.S. Cl.
CPC ............ *B60Q 1/068* (2013.01); *F21S 41/657* (2018.01); *F21V 21/14* (2013.01); *B60Q 1/0683* (2013.01);
(Continued)

(58) Field of Classification Search
CPC ...... B60Q 1/068; B60Q 1/0683; B60Q 1/076; F21S 41/657; F21S 14/02; F21S 21/30
See application file for complete search history.

(56) References Cited

U.S. PATENT DOCUMENTS 4,742,435 A * 5/1988 Van Duyn ............ B60Q 1/0683
362/289
4,939,945 A * 7/1990 Ryder .................. B60Q 1/0683
362/427
(Continued)

FOREIGN PATENT DOCUMENTS

| CN | 104100943 A | 10/2014 |
|----|-------------|---------|
| CN | 104520637 A | 4/2015  |

(Continued)

OTHER PUBLICATIONS

Machine translation of EP 2803528 A1 retrieved from ESPACENET (Year: 2021).*

(Continued)

*Primary Examiner* — Colin J Cattanach
(74) *Attorney, Agent, or Firm* — Valeo Vision

(57) ABSTRACT

The present disclosure relates to an adjustment device for a light emitting module of a vehicle. The adjustment device includes a light emitter support unit and adjustment conversion unit where the light emitter support unit includes a rotatable light emitter bracket configured to support a light emitter; the adjustment conversion unit includes an adjustment conversion structure and a translation member provided with a receiving part; a first support part of the light emitter bracket is moveably received in the receiving part; the adjustment conversion structure is configured to convert adjustment movements into translational movements via the translation member, thereby causing lamp bracket rotation;

(Continued)

and the first support part is in contact with an inner wall's annular section of the receiving part.

13 Claims, 8 Drawing Sheets

(51) Int. Cl.
  *F21V 21/14* (2006.01)
  *F21V 21/30* (2006.01)
  *B60Q 1/076* (2006.01)
  *F21V 14/02* (2006.01)
(52) U.S. Cl.
  CPC .............. *B60Q 1/076* (2013.01); *F21V 14/02* (2013.01); *F21V 21/30* (2013.01)

(56) References Cited

U.S. PATENT DOCUMENTS

| | | | | |
|---|---|---|---|---|
| 10,029,605 | B2 | 7/2018 | Kai et al. | |
| 2002/0001199 | A1* | 1/2002 | Dinant | B60Q 1/0683 362/514 |
| 2002/0006043 | A1* | 1/2002 | Dinant | F21S 41/19 362/547 |
| 2009/0050420 | A1* | 2/2009 | Poertzgen | B60T 13/746 188/156 |
| 2014/0146550 | A1* | 5/2014 | Leisse | B60Q 1/0433 362/460 |
| 2015/0176629 | A1 | 6/2015 | Tachiiwa | |
| 2016/0167564 | A1* | 6/2016 | Letoumelin | F21S 41/194 362/531 |
| 2016/0264040 | A1* | 9/2016 | Kai | B60Q 1/0483 |
| 2017/0349086 | A1* | 12/2017 | Toulisse | B60Q 1/0683 |
| 2018/0251065 | A1* | 9/2018 | Kappelhoff | B60Q 1/0683 |
| 2018/0297507 | A1* | 10/2018 | Patak | B33Y 10/00 |
| 2019/0092220 | A1* | 3/2019 | Aizawa | F21S 41/40 |
| 2019/0359117 | A1* | 11/2019 | Li | F21S 41/39 |
| 2020/0164789 | A1* | 5/2020 | Tajima | B60Q 1/076 |

FOREIGN PATENT DOCUMENTS

| | | | | |
|---|---|---|---|---|
| CN | 105972532 | A | | 9/2016 |
| CN | 106402125 | A | | 2/2017 |
| CN | 206459128 | U | | 9/2017 |
| DE | 3914873 | A1 | | 11/1989 |
| DE | 19527163 | A1 | * | 2/1996 ........... B60Q 1/0683 |
| DE | 10053723 | A1 | | 6/2001 |
| DE | 10131098 | A1 | * | 1/2003 ............. B60Q 1/122 |
| DE | 102010009283 | A1 | * | 8/2011 ............. B60Q 1/068 |
| DE | 102014200237 | A1 | | 7/2015 |
| EP | 1419931 | A2 | * | 5/2004 ............. B60Q 1/068 |
| EP | 2112021 | A1 | | 10/2009 |
| EP | 2786897 | A1 | * | 10/2014 ........... B60Q 1/0683 |
| EP | 2803528 | A1 | * | 11/2014 ........... B60Q 1/0683 |
| EP | 3176034 | A1 | | 6/2017 |
| EP | 3441261 | A1 | * | 2/2019 ........... B60Q 1/0683 |
| FR | 2543894 | A1 | * | 10/1984 ........... B60Q 1/0683 |
| JP | H01282044 | A | | 11/1989 |
| KR | 20160066405 | A | * | 6/2016 |
| WO | WO-2013107716 | A1 | * | 7/2013 ............... B60Q 1/06 |
| WO | WO-2016141926 | A1 | * | 9/2016 ............. B60Q 1/076 |

OTHER PUBLICATIONS

Machine translation of FR 2543894 A1 retrieved from the FIT database of PE2E search. (Year: 2022).*

National Intellectual Property Administration, PRC, International Search Report for corresponding PCT Application No. PCT/CN2019/076681, dated May 31, 2019.

European Patent Office, Supplemental European Search Report for corresponding European Patent Application No. EP19761134.6, dated Feb. 15, 2022.

The State Intellectual Property Office of People's Republic of China, First Office Action (with English translation) for corresponding Chinese Patent Application No. 201810175416.5, dated Feb. 28, 2022.

The State Intellectual Property Office of People's Republic of China, Second Office Action (with English translation) for corresponding Chinese Patent Application No. 201810175416.5, dated Aug. 17, 2022.

The State Intellectual Property Office of People's Republic of China, Supplemental Search for corresponding Chinese Patent Application No. 201810175416.5, dated Aug. 8, 2022.

* cited by examiner

ADJUSTMENT DEVICE FOR A VEHICLE LIGHT EMITTING MODULE

CROSS-REFERENCE TO RELATED APPLICATIONS

This application is filed under 35 U.S.C. § 371 U.S. National Phase of International Application No. PCT/CN2019/076681 filed Mar. 1, 2019 (published as WO2019166011), which claims foreign priority benefit to Chinese application No. 201810175416.5 filed on Mar. 2, 2018, the disclosures of which are herein incorporated by reference in their entirety.

TECHNICAL FIELD

The present disclosure relates to an adjustment device of a light emitting module applied to a vehicle.

BACKGROUND

Proper headlamp lighting is an important part of driving responsibility.

Dazzling glare from an opposite vehicle is mostly caused by misuse or improper aiming of the vehicle lighting apparatus. In fact, in addition to failure of an expected night road lighting guidance effect, improper use of vehicle lighting attachment may also cause a driver of the opposite vehicle to have a reduced recognition on the road since a strong light illumination to the driver of the opposite vehicle results in a visual residual of light and shadow. In severe cases, it can even result in unpredictable dangers and accidents.

In the prior art, a ball and socket joint structure is usually used to adjust positions of the headlamp bracket in order to obtain a desired illumination angle.

For example, Document EP2112021B1 discloses an adjustment device for a headlamp. The adjustment device is connected to a support body through a ball joint, to convert a translation movement in the adjustment direction into a swing motion of a light emitting module. However, the adjustment device has the disadvantage that it requires introduction of a plurality of adjusting elements to achieve an adjustment to the swing motion of the headlamp.

SUMMARY

Accordingly, an object of the present disclosure is to provide an adjustment device for a light emitting module, which is capable of adjusting an illumination angle of the light emitting module with a simple operation that saves space.

Another object of the present disclosure is to provide a light emitting module and a vehicle both comprising the adjustment device. According to an embodiment of the present disclosure, the adjustment device comprises a light emitter support unit and an adjustment conversion unit, the light emitter support unit comprises a rotatable light emitter bracket configured to support a light emitter, for example, a lamp, and the adjustment conversion unit comprises an adjustment conversion structure and a translation member provided with a receiving part, and a first support part of the light emitter bracket is moveably received in the receiving part, wherein, the adjustment conversion structure is configured to convert an adjustment movement of the adjustment device into a translation movement of the translation member, thereby the translation movement of the translation member causing rotation of the light emitter bracket, wherein, the first support part is in contact with an annular section of an inner wall of the receiving part.

According to a specific embodiment of the present invention, the first support part is columnar, preferably having a constant cross-sectional size; the inner wall of the receiving part has a narrowing portion in a longitudinal direction of the receiving part; and a cross-sectional size of the narrowing portion matches a cross-sectional size of the first support part. In this case, the first support part is in contact with the inner wall of the receiving part only at the narrowing portion. When the translation member brings the light emitter support unit to rotate about a corresponding rotational axis, since the first support part is in contact with the receiving part only at the narrowing portion, the rotation of the light emitter support unit will not be obstructed by the translation member. In particular, the first support part is able to slide and swing in the receiving part.

Preferably, the narrowing portion is provided in an end of the receiving part. Thereby, the formed narrowing portion has a conic inner wall.

Alternatively, the narrowing portion is provided in the middle of the receiving part. Thereby, the formed narrowing portion is formed of two conic inner walls that are connected at their smaller top ends and face outwardly at their greater bottom ends.

According to a specific embodiment of the present disclosure, the first support part has a spherical section, and the receiving part is columnar and has a diameter that matches a diameter of the spherical section. Thereby, it can also be achieved that rotation of the light emitter support unit will not be obstructed by the translation member.

According to a specific embodiment of the present disclosure, the adjustment conversion structure comprises an adjustment gear member and a gear sheath member, the adjustment gear member comprises a gear end and an adjustment end configured to mate with an adjustment tool, the gear end is provided with a first gear portion, the gear sheath member has a head, the head is provided with a second gear portion, and the first gear portion and the second gear portion are engaged with each other.

Further, the gear sheath member has an internal screw hole, the translation member has a screw rod, and the screw rod is engaged into the screw hole.

Furthermore, the adjustment device further comprises a support member configured to guide the translation member, so as to prevent the rotation of the support member.

In addition, the support member has a stop configured to limit a displacement of the translation member.

With the adjustment device of the present disclosure, an adjustment of the rotation of the lamp bracket for the light emitter can be achieved in a simple manner, that is, a support part of the light emitter bracket is able to slide and swing in the corresponding receiving part when the lamp bracket rotates about an axis of rotation, thereby the rotation of the light emitter bracket will not be interrupted by the inner wall of the receiving part. Here, the member comprising the receiving part is preferably made of plastic, such as PBT-GF30, so that it owns sufficient toughness while maintaining fatigue strength.

The present disclosure further relates to a light emitting module comprising the abovementioned adjustment device.

The present disclosure still further relates to a vehicle comprising the abovementioned light emitting module.

BRIEF DESCRIPTION OF THE DRAWINGS

The present disclosure will be further described and explained with reference to the accompanying drawings, in which.

DETAILED DESCRIPTION

Figure 1:
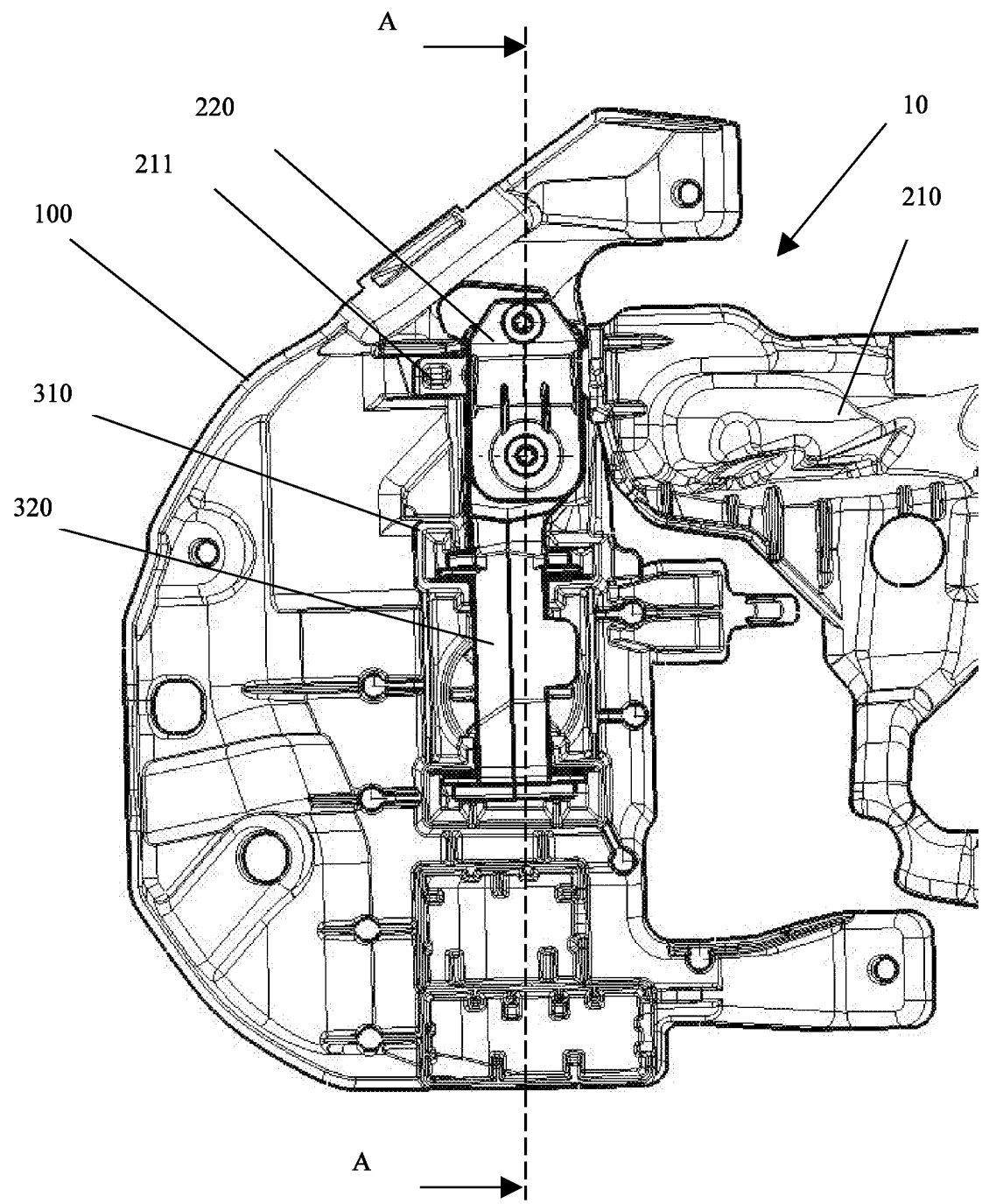
FIG. 1 is a schematic view showing an overall structure of an adjustment device for a light emitting module according to an embodiment of the present disclosure.

Embodiments of the present disclosure are exemplarily illustrated below. As those skilled in the art would understand that, the described embodiments may be modified in various different ways without departing from the concept of the present disclosure. The drawings and description are to be regarded as illustrative rather than limitative. In the following, the same reference numerals generally denote the same elements.

An adjustment device 10 according to the present disclosure is used for adjusting an illumination angle of a light emitting module. For this purpose, it is necessary to rotate a support, configured to support a light emitter such as a lamp, of the adjustment device 10 about an axis, for example a vertical axis or a horizontal axis, in order to acquire a desired illumination angle of the light emitting module.

Figure 2:
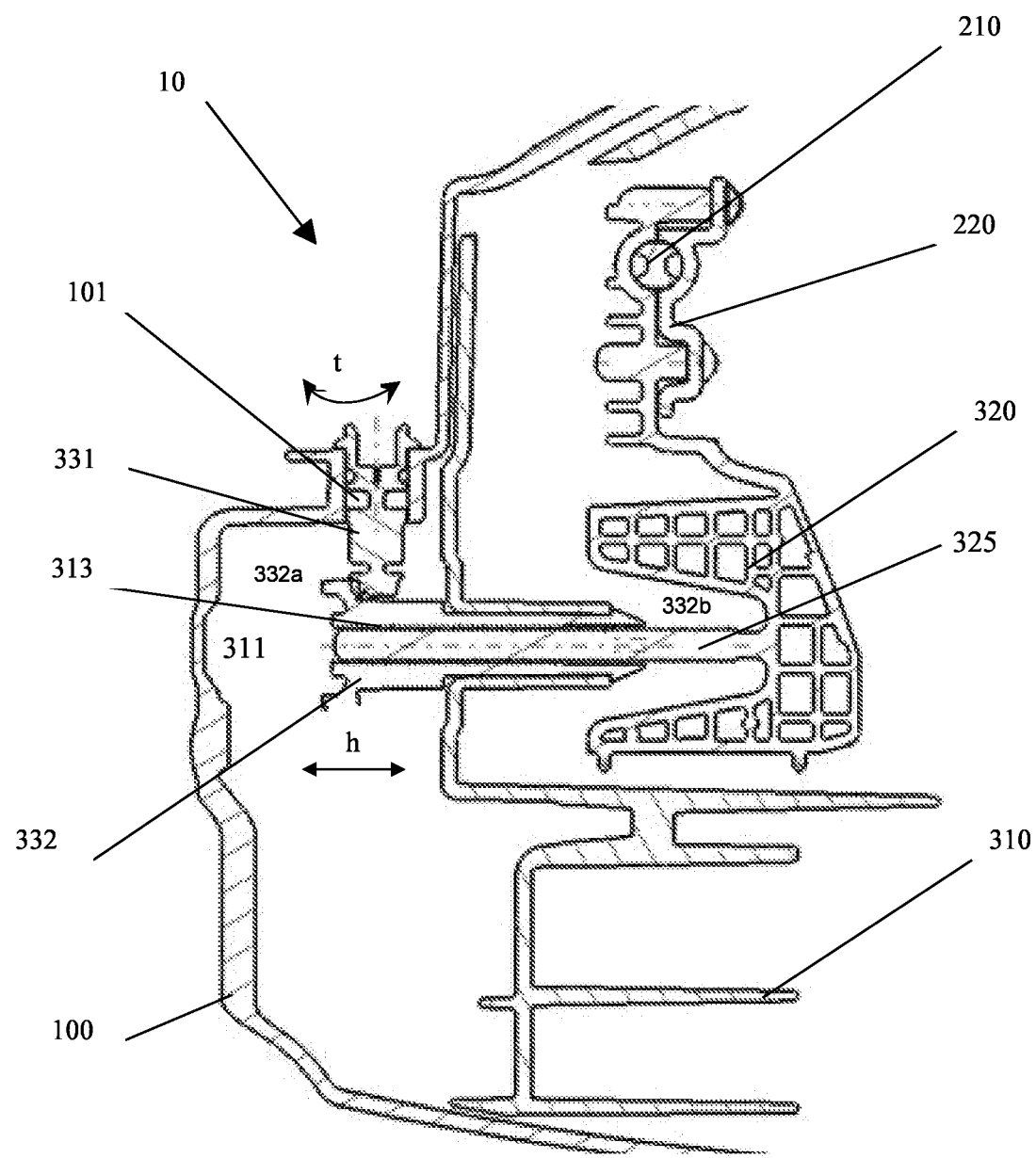
FIG. 2 is a sectional view showing the adjustment device along a line A-A of FIG. 1.

FIG. 1 shows an adjustment device 10 for adjusting an illumination angle of a light emitting module of a vehicle lamp, according to an embodiment of the present disclosure, in an assembled condition. FIG. 2 is a sectional view showing the adjustment device 10 along a sectional line A-A of FIG. 1.

The adjustment device 10 mainly comprises a light emitter support unit and an adjustment conversion unit. The light emitter support unit is provided in a housing 100, and is configured to support a light emitter such as a lamp (not shown). The adjustment conversion unit is also provided at the housing 100, and is configured for converting an adjustment implemented in an adjustment direction t (see FIG. 2) into a rotation of the light emitter support unit, to achieve an adjustment of the illumination angle of the light emitter supported by the light emitter support unit. Structures of these units and parts of the adjustment device 10 and functional relationship between them will be described in detail hereinafter.

Referring to FIG. 1 and FIG. 2, the light emitter support unit mainly comprises a light emitter bracket 210 configured to support a light emitter such as a lamp. The light emitter bracket 210 is mounted on a translation member 320, which will be described in detail hereinafter, of the adjustment conversion unit.

The adjustment conversion unit mainly comprises: a support member 310, the translation member 320 and an adjustment conversion structure. The adjustment conversion structure comprises an adjustment gear member 331 and a gear sheath member 332. The support member 310 is fixed in the housing 100. The translation member 320 is movably held at the support member 310 and is configured to displace in a horizontal direction h relative to the support member 310. The adjustment conversion structure is configured to convert an adjustment implemented in the adjustment direction t into a displacement of the translation member 320 in the horizontal direction h relative to the support member 310. As described above, the light emitter support unit comprising the light emitter bracket 210 is mounted on the translation member 320.

Figure 3:
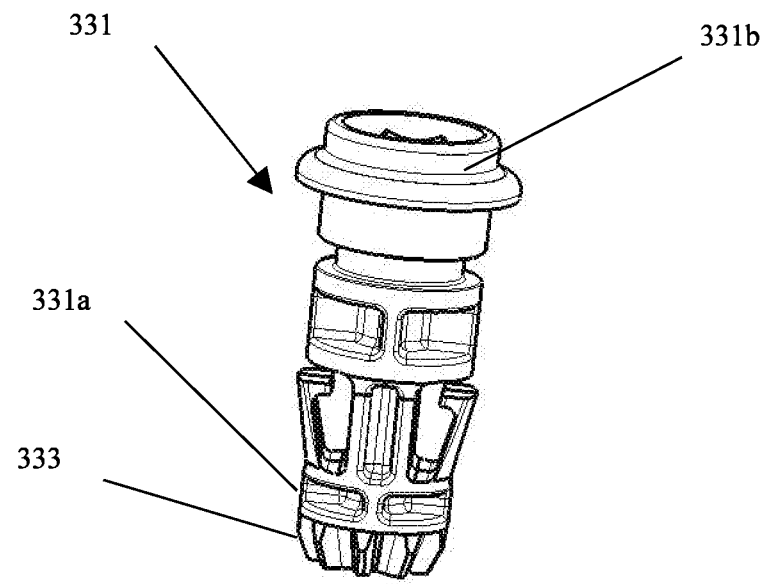
FIG. 3 is a perspective view showing one member of an adjustment mechanism of the adjustment device according to an embodiment of the present disclosure.

The housing 100 is provided with an opening 101 on its rear side, and the adjustment gear member 331 of the adjustment conversion structure is rotatably provided in the opening 101 of the housing 100. Referring to FIG. 3, the adjustment gear member 331 is provided with a shoulder and flexibly deformable jaws. A section between the shoulder and the flexibly deformable jaws has a diameter corresponding to a diameter of the opening 101 and has a length corresponding to a depth of the opening 101. Accordingly, when the adjustment gear member 331 is inserted into the opening 101 of the housing 100, firstly the jaws are deformed flexibly until the shoulder of the adjustment gear member 331 abuts against a side of the housing 100, then the jaws protrude from the opening 101, return to its original shape with its end abuts against the other side of the housing 100, thereby the adjustment gear member 331 is held at the opening 101 of the housing 100. In addition, the adjustment gear member 331 has a gear end 331a and an adjustment end 331b configured to mate with an adjustment tool (not shown), the adjustment end 331b of the gear member 331 is exposed beyond the opening 101 of the housing 100, and the gear end 331a of the gear member 331 is provided with a first gear portion 333.

Figure 4:
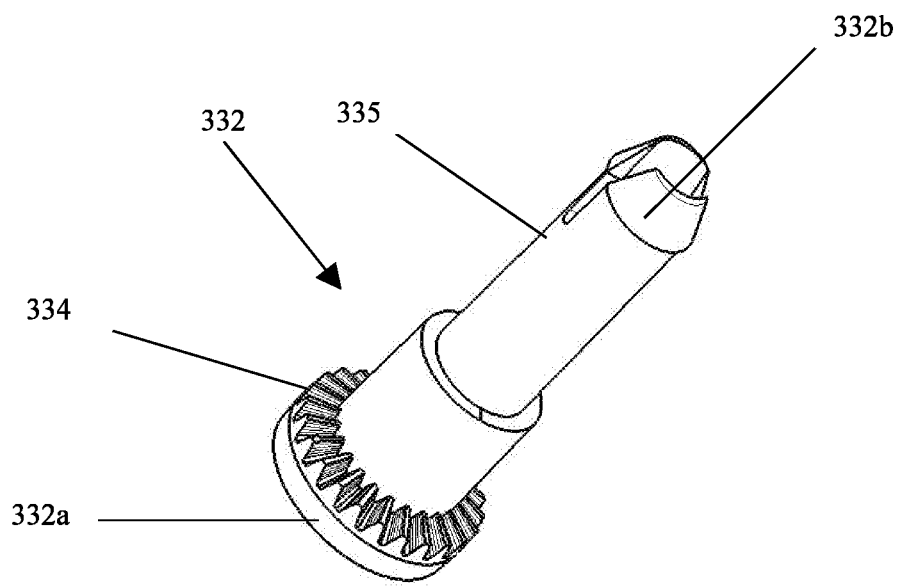
FIG. 4 is a perspective view showing another member of the adjustment mechanism of the adjustment device according to an embodiment of the present disclosure.

Referring to FIG. 4, the gear sheath member 332 has a head 332a and an elastic clip 332b, the head 332a is provided with a second gear portion 334 thereon, and, in an assembled condition, the second gear portion 334 is engaged with the first gear portion 333 of the gear end 331a of the adjustment gear member 331, to convert a rotation of the adjustment gear member 331 in an adjustment direction t into a rotation of the gear sheath member 332 during a conversion operation. The gear sheath member 332 is rotatably provided on the support member 310, more specifically, is rotatably provided in a through hole 311 of the support member 310, such that end sides of the shoulder and the elastic clip 332b of the gear sheath member 332 abut against two end sides of the through hole 311, respectively. A recessed section 335 between the shoulder and the elastic clip 332b of the gear sheath member 332 has a diameter corresponding to a diameter of the through hole 311 of the support member 310. The elastic clip 332b is provided at one end of the recess section 335, and is configured to elastically deform when the gear sheath member 332 is inserted into the through hole 311 of the support member 310, and to ensure that in an assembled condition two end sides of the recessed section 335 abut against two end sides of the through hole 311, respectively, thereby preventing the movement of the gear sheath member 332 in the through hole 311. In addition, the gear sheath member 332 also has a screw hole 313 having internal threads and extending in a longitudinal direction of the gear sheath member 332.

Figure 5:
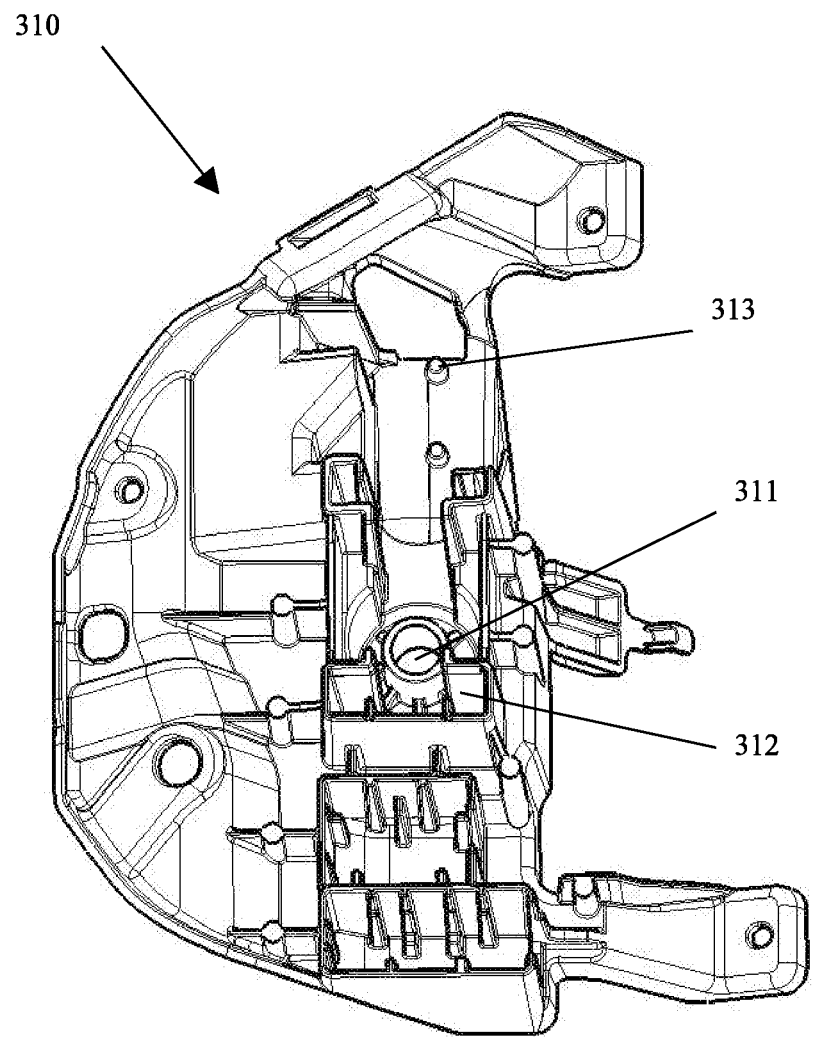
FIG. 5 is a perspective view showing a support member of the adjustment device according to an embodiment of the present disclosure.

FIG. 5 shows a perspective view of the support member 310. In addition to including the through hole 311, the support member 310 also has a stop 313 and a guide section 312. The stop 313 is configured to limit an extreme of the movement of the translation member 320, which will be described below, and the guide section 312 is configured to guide a related or corresponding section of the translation member.

Figure 6:
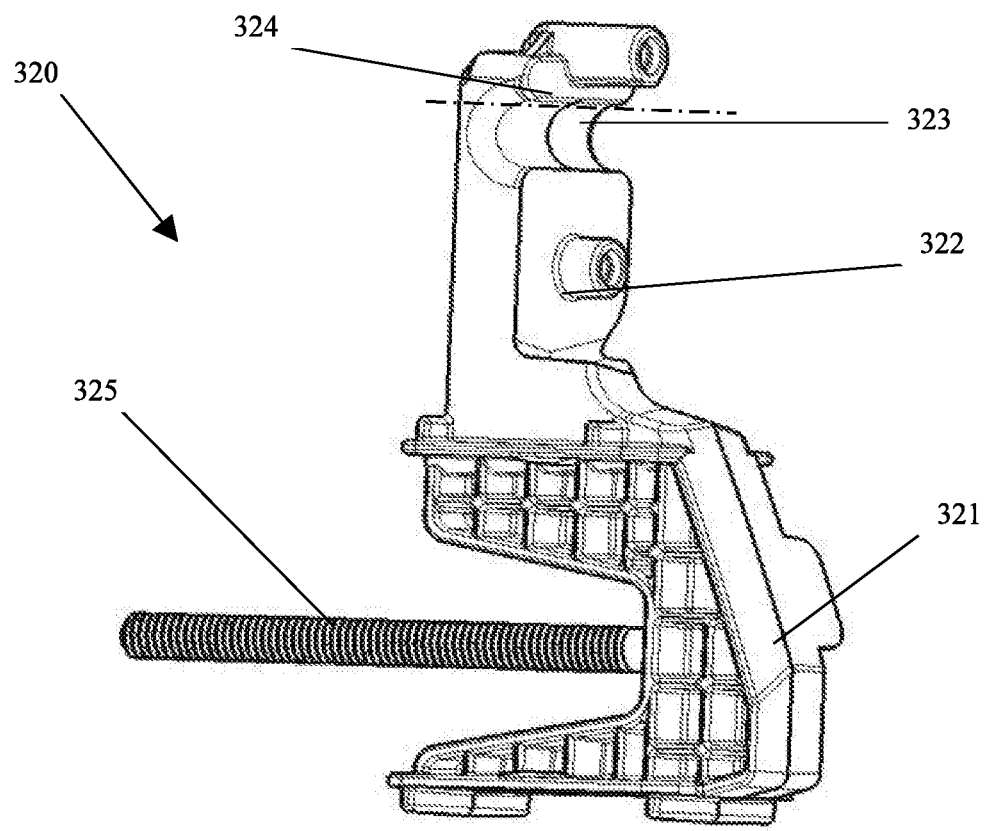
FIG. 6 is a perspective view showing a translation member of the adjustment device according to an embodiment of the present disclosure.
Figure 7:
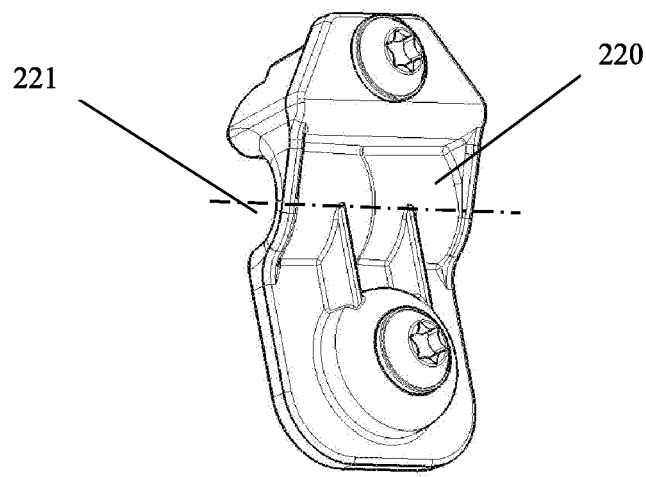
FIG. 7 is a perspective view showing a coverage member of the adjustment device according to an embodiment of the present disclosure.
Figure 8:
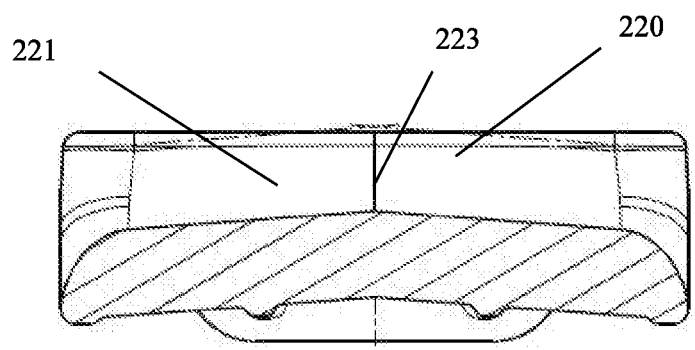
FIG. 8 is a sectional view showing the coverage member of the adjustment device according to an embodiment of the present disclosure.

FIG. 6 shows a perspective view of the translation member 320. The translation member 320 mainly comprises a lower section 321 and an upper section 322. The lower section 321 is received in the guide section 312 of the support member 310, to allow the translation member 320 to make the translation movement only. To this end, the lower section 321 of the translation member 320 and the guide section 312 of the support member 310 make a proper connection therebetween through shape fit. A screw rod 325 of the translation member 320 is provided at the lower section 321. Here, the screw rod 325 and the lower section 321 can be embodied in one piece, or can be manufactured separately and then is connected fixedly in a suitable manner. The outer side of the screw rod 325 is formed with external threads. The external threads and the internal threads of the screw hole cooperate when the screw rod 325 is fixed in the screw hole of the gear sheath member 332.

In the assembled condition of the adjustment conversion unit, when the adjustment tool is acted on the adjustment end 331b of the adjustment gear member 331 in the adjustment direction t, the adjustment gear member 331 starts to rotate and thereby brings the gear sheath member 332 engaged with the gear end 331a to rotate. Because the gear sheath member 332 is rotatably held in the through hole 311 of the support member 310 while being not capable of being moved along its longitudinal direction and the screw rod 325 of the translation member 320 is in a threaded connection to the screw hole 313 with internal threads of the sheath member 332, the rotation of the gear sheath member 332 is converted, by cooperating with the guide section 312 of the support member 310, into the translation movement of the translation member 320 in the direction h.

As can also be seen in FIG. 6, the upper section 322 of the translation member 320 is further provided with a receiving part 323 configured to receive a support part of the light emitter bracket 210. In an embodiment, the receiving part 323 is in the form of a groove. In order to reliably hold the bracket 210 in the receiving part 323, a coverage element 220 is additionally provided to cover a first support part 211 of the light emitter bracket 210 after the first support part 211 of the bracket 210 is held in the receiving part 323, forming a closed receiving hole.

Figure 10:
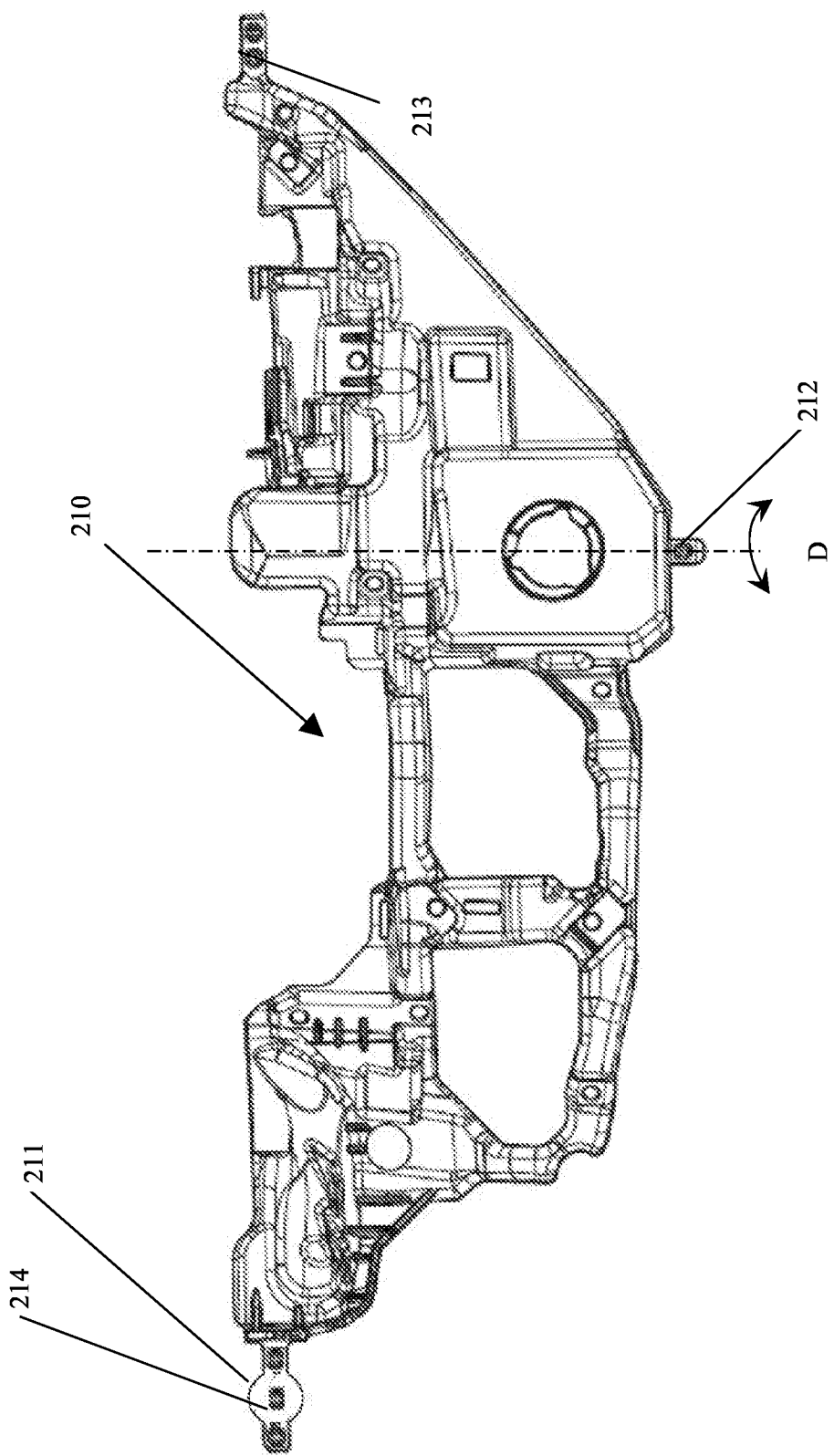
FIG. 10 is another schematic view showing the bracket.

The light emitter bracket 210 (see FIGS. 10 and 11) includes the first support part 211, a second support part 212 and a third support part 213, all of which are columnar rods. The second support part 212 is rotatably held in the housing 100, and the light emitter bracket 210 is able to rotate about an axis D during adjustment movement. Other support parts of the bracket 210 are held at related or corresponding receiving parts, so that the bracket 219 cannot move in the direction of axis D. Preferably, the center of gravity of the light emitter bracket 210 is within a triangular region defined by the first support part 211, the second support part 212 and the third support part 213, which is particularly advantageous for anti-vibration.

In particular, the first support part 211 of the light emitter bracket 210 is mounted in the receiving hole of the translation member 320.

If the first support part 311 is a support rod having a substantially constant cross section, the receiving hole has a narrowing portion 324 in the longitudinal direction thereof Due to existence of the narrowing portion 324, the first support part 311 is in contact with the inner wall of the receiving part 323 only at an annular section of the inner wall, thereby, when implementing the translation movement of the translation member 320, the rotation of the bracket 210 about the axis D will not be obstructed by the contact between the peripheral side of the first support part 311 and the entirely inner wall of the receiving part 323, that is, the first support part can swing in the receiving hole. Preferably, there is a linear contact between the first support part 311 and the inner wall of the receiving part 323.

In FIG. 6, it is shown that the receiving part 323 is in the form of a groove, and the narrowing portion 324 is in the middle of the receiving part 323. In this case, when the receiving hole is formed of the receiving part 323 and another receiving part 221 of the coverage element 220, the two receiving parts are complementary to each other and their inner walls have the same orientation. When another receiving part 221 of the coverage element and the receiving part 323 of the translation member 320 form the closed receiving hole, a size of the narrowing portion 324 match a size of the first support part 211 of the bracket 210, so that the first support part 211 and the receiving hole are in contact with each other only at the narrowing portion, while the rest sections of the receiving hole are not in contact with outer peripheral side of the first support part 211. FIG. 2 is a sectional view across the narrowing portion. It can be seen that, the size of the narrowing portion matches that of the first support part 211 of the bracket 210. In other words, the inner wall of the entire receiving hole is formed of two truncated conic surfaces that are connected at their smaller top ends and face outwardly at their greater bottom ends.

Alternatively, the narrowing portion of the inner wall of the receiving hole can also be provided at the end, so that the inner wall of the formed receiving hole is formed of a truncated cone. In this case, the smallest-sized end face has its shape matching the cross section of the first support part 211 of the bracket 210, thereby achieving a partial contact without obstructing rotation of the bracket 210.

In addition to the groove-shaped receiving part 323 of the translation member 320 described above, the receiving part 323 can also be a closed receiving hole with its inner wall having the abovementioned shape, i.e., the narrowing portion. In this case, the receiving part 323 is formed of two truncated conic surfaces that are connected at their smaller top ends or formed of one truncated conic surface. The smallest portion of the receiving hole has a cross section matching the cross section of the support part of the bracket, to limit the motion of the support part in a direction transverse to the longitudinal direction of the receiving hole. In this case, no coverage element 220 needs be provided.

Figure 9:
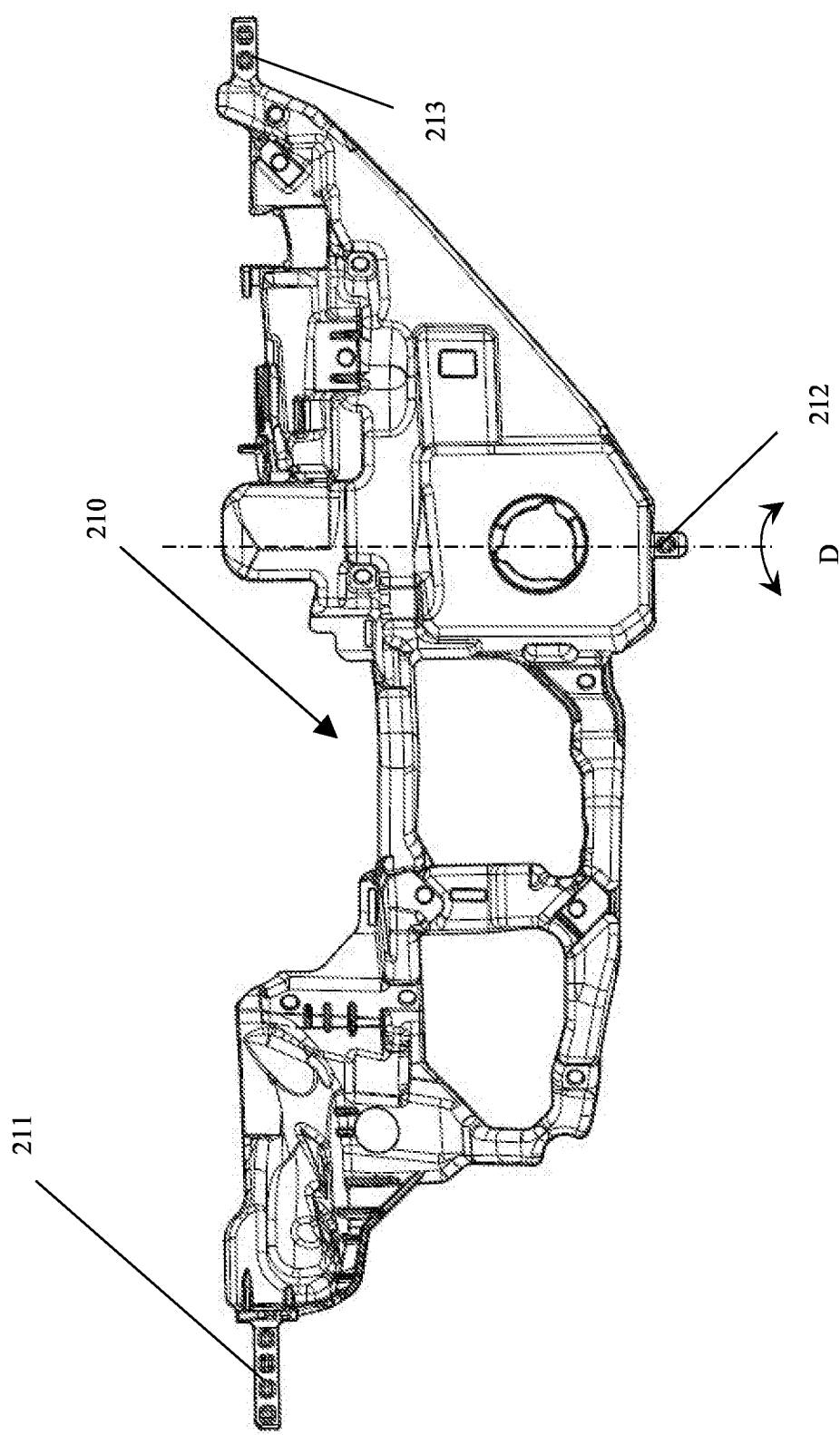
FIG. 9 is a schematic view showing a bracket.

Preferably, a recess can be provided in the first support part 211, as those shown in FIG. 2 and FIG. 9, in order to further reduce the weight of the lamp bracket 210 and improve structural strength of the support part.

In another embodiment of the adjustment device 10, its structure is substantially similar to that in the abovementioned embodiment, but differs only in the shape of the first support part of the light emitter bracket and the structure of the first support part of the light emitter bracket, which herein may refer to the above description for the sake of brevity.

Different from that the first support part 311 is columnar having a substantially constant cross section according to the above embodiment, the first support part 211 (shown in FIG. 10) has a spherical section 214 having a diameter greater than horizontal dimensions of other sections of the first support part. In order to enable rotation of the lamp bracket 210 about the axis D, it only requires to modify the structure of the receiving part 323, for receiving the lamp bracket 210, of the first support part 211 of translation member 320, and if necessary, also to modify the structure of the inner wall, for mating with the receiving part 323 of the translation member 320, of the another receiving part 221 of the coverage element 220, that is to say, the formed receiving hole is a columnar hole having a constant cross section. In this case, there is no obstruction to the movement of the first support part 211 in the receiving hole when the light emitter bracket 210 is driven to rotate about the axis D, that is to say, the spherical section 214 can slide in the columnar hole and the first support part 211 can swing in the receiving hole when the light emitter bracket 210 rotates about the axis D Here, in particular, sizes of the first support part of the bracket and the corresponding receiving hole can be designed according to required range of adjustment, for example, based on the upper and lower limits of the range of the swing of the lamp bracket. The movement of the first support part in the receiving hole is limited when the bracket is rotated to an extreme in position, thereby preventing the bracket from continuing to rotate about the axis.

The above members or parts are preferably made of a plastic material, for example, the receiving part is made of PBT-GF30, so that it owns sufficient toughness while maintaining fatigue strength.

It should be noted that the adjustment conversion structure is not limited to the structure of gear engagement shown above, and other structures and driving methods capable of realizing translation movement of the translation member are feasible.

The present disclosure is not limited to the above configuration, and various other modifications may be employed. While the present disclosure has been described by way of several embodiments, those skilled in the art can devise other embodiments based on these mentioned embodiments without departing from the protective scope of the present disclosure. Therefore, the protective scope of the present disclosure should be limited only by the appended claims.

What is claimed is:

1. An adjustment device of a vehicle's light emitting module configured to adjust aiming of an illumination angle, the adjustment device comprising a rotatable light emitter bracket mounted on a translation member configured to support a light emitter, the translation member provided with a single screw rod; a support member configured to guide the translation member by means of an adjustment conversion structure, wherein the adjustment conversion structure includes an adjustment gear member and a gear sheath member and said screw rod;

the gear sheath member including a head and an elastic clip that is split apart through an end of the elastic clip;

a longitudinal axis of the adjustment gear member set orthogonal to a longitudinal axis of the gear sheath member in the installed position;

the adjustment gear member inserted into an opening of a housing and configured to directly engage the gear sheath member that traverses a through hole of the support member;

the elastic clip configured to elastically deform and secure the gear sheath member with insertion of the gear sheath member through the through hole of the support member;

a recess section that encompasses opposing sides of the screw rod, the number of internal threads of the gear sheath member and the elastic clip such that a volumetric spacing between the support member and the translation member is configured to be reduced with operation of the adjustment gear member; and wherein the adjustment device is configured to convert a movement of the adjustment gear member into a translation movement of the translation member, thereby causing rotational movement of the rotatable light emitter bracket.

2. The adjustment device of claim 1, wherein, a first support part is columnar, an inner wall of a receiving part has a narrowing portion in a longitudinal direction of the receiving part, and a cross-sectional size of the narrowing portion matches a cross-sectional size of the first support part.

3. The adjustment device of claim 2, wherein, the narrowing portion is provided in an end of the receiving part.

4. The adjustment device of claim 2, wherein, the narrowing portion is provided in a middle of the receiving part.

5. The adjustment device of claim 1, wherein a first support part has a spherical section, and a receiving part is columnar and has a diameter that matches a diameter of the spherical section.

6. The adjustment device of claim 1, wherein a receiving part is made of a plastic material.

7. The adjustment device of claim 6, wherein, the receiving part is made of a plastic material having a toughness characteristic of PBT-GF30.

8. The adjustment device of claim 1, wherein, the adjustment gear member comprises a gear end and an adjustment end configured to mate with an adjustment tool, the gear end is provided with a first gear portion, the head of the gear sheath member is provided with a second gear portion and the first gear portion and the second gear portion are engaged with each other.

9. The adjustment device of claim 8, wherein the gear sheath member has a screw hole and the screw rod is engaged into the screw hole.

10. The adjustment device of claim 9, wherein the support member has a stop configured to limit displacement of the translation member.

11. A light emitting module comprising the adjustment device of claim 1.

12. A vehicle comprising the light emitting module of claim 11.

13. An adjustment device of a vehicle's light emitting module configured to adjust aiming of an illumination angle, the adjustment device comprising a rotatable light emitter bracket mounted on a translation member configured to support a light emitter; the translation member provided with a single screw rod; a support member configured to guide the translation member by means of an adjustment conversion structure, wherein the adjustment conversion structure includes an adjustment gear member and the gear sheath member and said screw rod;

the gear sheath member including a head and an elastic clip that is split apart through an end of the elastic clip;

a longitudinal axis of the adjustment gear member set orthogonal to a longitudinal axis of the gear sheath member in the installed position;

the adjustment gear member inserted into an opening of a housing and configured to directly engage the gear sheath member that traverses the through hole of the support member;

the elastic clip configured to elastically deform and secure the gear sheath member with insertion of the gear sheath member through a through hole of the support member; and wherein the adjustment conversion structure is configured to convert a movement of said adjustment gear member into a movement of the translation member thereby causing rotation of the rotatable light emitter bracket.

* * * * *